US010936269B2

(12) United States Patent
Hatakeyama (10) Patent No.: US 10,936,269 B2
(45) Date of Patent: Mar. 2, 2021

(54) PRINTING SYSTEM, PRINTER, AND PRINTING CONTROL METHOD

(71) Applicant: Seiko Instruments Inc., Chiba (JP)

(72) Inventor: Koichi Hatakeyama, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 16/451,364

(22) Filed: Jun. 25, 2019

(65) Prior Publication Data

US 2020/0004486 A1 Jan. 2, 2020

(30) Foreign Application Priority Data

Jun. 29, 2018 (JP) .............................. JP2018-124146

(51) Int. Cl.
*G06F 3/12* (2006.01)

(52) U.S. Cl.
CPC .......... *G06F 3/1297* (2013.01); *G06F 3/1206* (2013.01); *G06F 3/1247* (2013.01); *G06F 3/1263* (2013.01); *G06F 3/1288* (2013.01)

(58) Field of Classification Search
CPC .... G06F 3/1297; G06F 3/1206; G06F 3/1247; G06F 3/1263; G06F 3/1288
USPC ................. 358/1.15, 1.9, 470, 539
See application file for complete search history.

(56) References Cited

U.S. PATENT DOCUMENTS

| 2014/0055816 | A1* | 2/2014 | Sekine | ................ | G06F 3/1212 |
| | | | | | 358/1.15 |
| 2018/0086105 | A1* | 3/2018 | Naka | ................... | G06F 3/1206 |
| 2018/0339523 | A1* | 11/2018 | Yajima | ................... | B41J 2/325 |

FOREIGN PATENT DOCUMENTS

| EP | 1128256 A2 | 8/2001 |
| EP | 1717691 A2 | 11/2006 |
| EP | 2128799 A2 | 12/2009 |
| JP | 2000-298566 A | 10/2000 |
| JP | 2011-238090 | 11/2011 |

OTHER PUBLICATIONS

Extended European Search Report in Europe Application No. 19182678.3, dated Nov. 21, 2019, 6 pages.

* cited by examiner

*Primary Examiner* — Quang N Vo
(74) *Attorney, Agent, or Firm* — Brinks Gilson & Lione

(57) ABSTRACT

A printing system includes a host apparatus configured to transmit a command to a printer, and a printer configured to perform processing based on the command received from the host apparatus. The host apparatus is configured to convert the command based on a conversion condition when the command satisfies a predetermined condition, and transmit a conversion code obtained through the conversion to the printer as the command. The printer includes a receiver configured to receive the command from the host apparatus, a command converter configured to discriminate whether the received command is the conversion code obtained through the conversion based on the conversion condition, and when the command is the conversion code, convert the conversion code into the command based on the conversion condition, and a command processor configured to execute the command obtained through the conversion by the command converter when the command is the conversion code, and execute the received command when the command is not the conversion code.

8 Claims, 5 Drawing Sheets

FIG.1

| | |
|---|---|
| 1 | HOST APPARATUS |
| 2 | PRINTER |
| 11 | DATA TRANSMITTER |
| 12 | CONTROLLER |
| 13, 28 | STORAGE |
| 21 | DATA RECEIVER |
| 22 | REAL-TIME COMMAND PROCESSOR |
| 23 | RECEPTION BUFFER |
| 24 | SERIAL COMMAND PROCESSOR |
| 25 | PRINTING CONTROLLER |
| 26 | SHEET FEEDING MOTOR |
| 27 | THERMAL HEAD |
| 211 | FIRST COMMAND CONVERTER |
| 241 | SECOND COMMAND CONVERTER |

FIG.2

|    | 0  | 1  | 2  | 3  | 4  | 5  | 6  | 7  | 8  | 9  | 10 | 11 | 12 | 13 | 14 | 15 |
|----|----|----|----|----|----|----|----|----|----|----|----|----|----|----|----|----|
| 0  | 00 | 10 | 20 | 30 | 40 | 50 | 60 | 70 | 80 | 90 | A0 | B0 | C0 | D0 | E0 | F0 |
| 1  | 01 | 11 | 21 | 31 | 41 | 51 | 61 | 71 | 81 | 91 | A1 | B1 | C1 | D1 | E1 | F1 |
| 2  | 02 | 12 | 22 | 32 | 42 | 52 | 62 | 72 | 82 | 92 | A2 | B2 | C2 | D2 | E2 | F2 |
| 3  | 03 | 13 | 23 | 33 | 43 | 53 | 63 | 73 | 83 | 93 | A3 | B3 | C3 | D3 | E3 | F3 |
| 4  | 04 | 14 | 24 | 34 | 44 | 54 | 64 | 74 | 84 | 94 | A4 | B4 | C4 | D4 | E4 | F4 |
| 5  | 05 | 15 | 25 | 35 | 45 | 55 | 65 | 75 | 85 | 95 | A5 | B5 | C5 | D5 | E5 | F5 |
| 6  | 06 | 16 | 26 | 36 | 46 | 56 | 66 | 76 | 86 | 96 | A6 | B6 | C6 | D6 | E6 | F6 |
| 7  | 07 | 17 | 27 | 37 | 47 | 57 | 67 | 77 | 87 | 97 | A7 | B7 | C7 | D7 | E7 | F7 |
| 8  | 08 | 18 | 28 | 38 | 48 | 58 | 68 | 78 | 88 | 98 | A8 | B8 | C8 | D8 | E8 | F8 |
| 9  | 09 | 19 | 29 | 39 | 49 | 59 | 69 | 79 | 89 | 99 | A9 | B9 | C9 | D9 | E9 | F9 |
| 10 | 0A | 1A | 2A | 3A | 4A | 5A | 6A | 7A | 8A | 9A | AA | BA | CA | DA | EA | FA |
| 11 | 0B | 1B | 2B | 3B | 4B | 5B | 6B | 7B | 8B | 9B | AB | BB | CB | DB | EB | FB |
| 12 | 0C | 1C | 2C | 3C | 4C | 5C | 6C | 7C | 8C | 9C | AC | BC | CC | DC | EC | FC |
| 13 | 0D | 1D | 2D | 3D | 4D | 5D | 6D | 7D | 8D | 9D | AD | BD | CD | DD | ED | FD |
| 14 | 0E | 1E | 2E | 3E | 4E | 5E | 6E | 7E | 8E | 9E | AE | BE | CE | DE | EE | FE |
| 15 | 0F | 1F | 2F | 3F | 4F | 5F | 6F | 7F | 8F | 9F | AF | BF | CF | DF | EF | FF |

▓ CONVERSION CODE FOR REAL-TIME COMMAND
☐ CODE FOR SERIAL COMMAND
▨ FIRST BYTE OF CONVERSION CODE FOR SERIAL COMMAND

PRINTING SYSTEM, PRINTER, AND PRINTING CONTROL METHOD

RELATED APPLICATIONS

Priority is claimed on Japanese Patent Application No. 2018-124146, filed on Jun. 29, 2018, the content of which is incorporated herein by reference.

BACKGROUND OF THE INVENTION

1. Field of the Invention

The present invention relates to a printing system, a printer, and a printing control method.

2. Description of the Related Art

When receiving commands from a host apparatus, a printer executes the commands in a received order thereof. Incidentally, kinds of processing to be executed by the printer include a kind of processing having a high priority. When such a kind of processing is to be executed, the host apparatus configured to transmit a command sometimes performs control for transmitting a command indicating the kind of processing having a high priority first.

Examples of such a command for the printer include a real-time command for successively analyzing received pieces of data to process the pieces of data and a serial command for storing received pieces of data in a reception buffer and then successively extracting the pieces of data from the reception buffer to process the pieces of data. However, a related-art command system, processing scheme for transmission from the host apparatus, and processing scheme for reception to be performed by the printer have a problem in that a data section of an image command being a serial command is sometimes erroneously recognized as a real-time command. That is, when the same data sequence as a real-time command data sequence, is accidentally included in image data, data transmitted as the image data is sometimes unintentionally interpreted as a real-time command to be processed. To avoid this, the host apparatus is required to confirm that a real-time command sequence is absent in the image data, and when the real-time command data sequence is present, it is required to take measures to, for example, change a part of the image data.

In view of the foregoing, in the field of this type of printer technology, there have been demands for a printing system, a printer, and a printing control method that are capable of preventing erroneous recognition of a command by simple processing.

SUMMARY OF THE INVENTION

According to one embodiment of the present invention, there is provided a printing system, including a host apparatus configured to transmit as command to a printer, and a printer configured to perform processing based on the command received from the host apparatus, the host apparatus being configured to convert the command based on a conversion condition when the command satisfies a predetermined condition, and transmit a conversion code obtained through the conversion to the printer as the command, the printer including a receiver configured to receive the command from the host apparatus, a command converter configured to discriminate whether the received command is the conversion code obtained through the conversion based on the conversion condition, and when the command is the conversion code, convert the conversion code into the command based on the conversion condition, and a command processor configured to execute the command obtained through the conversion by the command converter when the command is the conversion code, and execute the received command when the command is not the conversion code.

In the above-mentioned printer according to the one embodiment of the printing system, wherein the command includes any one of a serial command for which processing is to be successively executed by the printer after reception of the serial command and a real-time command for which processing is to be executed by the printer with a priority higher than in a case of the serial command, and wherein the command converter is configured to determine that the command is the real-time command when the received command is the conversion code for the real-time command, determine that the command is the serial command when the received command is the conversion code for the serial command, and determine that the command is the serial command when the received command is not the conversion code for the real-time command and is not the conversion code for the serial command.

In the above-mentioned printer according to the one embodiment of the printing system, wherein the host apparatus is configured to divide, in a case of transmitting the real-time command, a data byte of the real-time command into most significant bits and least significant bits, and transmit two bytes obtained by converting the most significant bits and the least significant bits into a conversion code for the veal-time command to the printer as the command, and discriminate, in a case of transmitting the serial command, whether data of the serial command includes one of a conversion code for the real-time command and a conversion code for the serial command, transmit, when a data byte of the serial command is a conversion code for the serial command, a command obtained by converting the data byte into a two-byte conversion code for the serial command to the printer as the command, and transmit, when a data byte of the serial command is a conversion code for the real-time command, a command obtained by converting the data byte into two-byte data in which a code for the serial command follows the conversion code for the serial command to the printer as the command, wherein the command converter includes a first command converter and a second command converter, wherein the command processor includes a serial command processor configured to execute processing based on the serial command, and a real-time command processor configured to execute processing based on the real-time command, wherein the first command converter is configured to determine that the command is the real-time command when the received command is the conversion code for the real-time command, convert the conversion code for the real-time command into the real-time command based on the conversion condition, and output the real-time command obtained through the conversion to the real-time command processor, and wherein the second command converter is configured to determine that the command is the serial command when the received command is the conversion code for the serial command, convert the conversion code for the serial command into the serial command based on the conversion condition, and output the serial command obtained through the conversion to the serial command processor, and determine that the command is the serial command when the received command is not the conversion code for the real-time command and is not the conversion code for the serial command, and output the command to the serial command processor.

According to one embodiment of the present invention, there is provided a printer, including a receiver configured to receive a command directed to the printer, a command converter configured to discriminate whether the received command is a conversion code obtained through conversion based on a predetermined conversion condition, and when the command is the conversion code, convert the conversion code into the command based on the predetermined conversion condition, and a command processor configured to execute the command obtained through the conversion by the command converter when the command is the conversion code, and execute the received command when the command is not the conversion code.

In the above-mentioned printer according to the one embodiment of the printer, wherein the command includes any one of a serial command for which processing is to be successively executed by the printer after reception of the serial command and a real-time command for which processing is to be executed by the printer with a priority higher than in a case of the serial command, and wherein the command converter is configured to determine that the command is the real-time command when the received command is the conversion code for the real-time command, determine that the command is the serial command when the received command is the conversion code for the serial command, and determine that the command is the serial command when the received command is not the conversion code for the real-time command and is not the conversion code for the serial command.

In the above-mentioned printer according to the one embodiment of the printer, wherein the command converter includes a first command converter, and a second command converter, wherein the command processor includes a serial command processor configured to execute processing based on the serial command, and a real-time command processor configured to execute processing based on the real-time command, wherein the first command converter is configured to determine that the command is the real-time command when the received command is the conversion code for the real-time command, convert the conversion code for the real-time command into the real-time command based on the predetermined conversion condition, and output the real-time command obtained through the conversion to the real-time command processor, and wherein the second command converter is configured to determine that the command is the serial command when the received command is the conversion code for the serial command, convert the conversion code for the serial command into the serial command based on the predetermined conversion condition, and output the serial command obtained through the conversion to the serial command processor, and determine that the command is the serial command when the received command is not the conversion code for the real-time command and is not the conversion code for the serial command, and output the command to the serial command processor.

According to one embodiment of the present invention, there is provided a printing control method to be performed in a printing system, including the printing system including a host apparatus configured to transmit a command to a printer, and a printer configured to perform processing based on the command received from the host apparatus, the printing control method comprising: converting, by the host apparatus, the command based on a conversion condition when the command satisfies a predetermined condition, and transmitting a conversion code obtained through the conversion to the printer as the command, receiving by the printer, the command from the host apparatus, discriminating by the printer, whether the received command is the conversion code obtained through the conversion based on the conversion condition, and when the command is the conversion code, converting the conversion code into the command based on the conversion condition, and executing by the printer, the command obtained through the conversion when the command is the conversion code, and executing the received command when the command is not the conversion code.

According to one embodiment of the present invention, there is provided a printing control method to be performed in a printer, including receiving a command directed to the printer, discriminating whether the received command is a conversion code obtained through conversion based on a predetermined conversion condition, and when the command is the conversion code, converting the conversion code into the command based on the predetermined conversion condition, and executing the command obtained through the conversion when the command is the conversion code, and executing the received command when the command is not the conversion code.

DETAILED DESCRIPTION OF THE PREFERRED EMBODIMENTS

Figure 1:
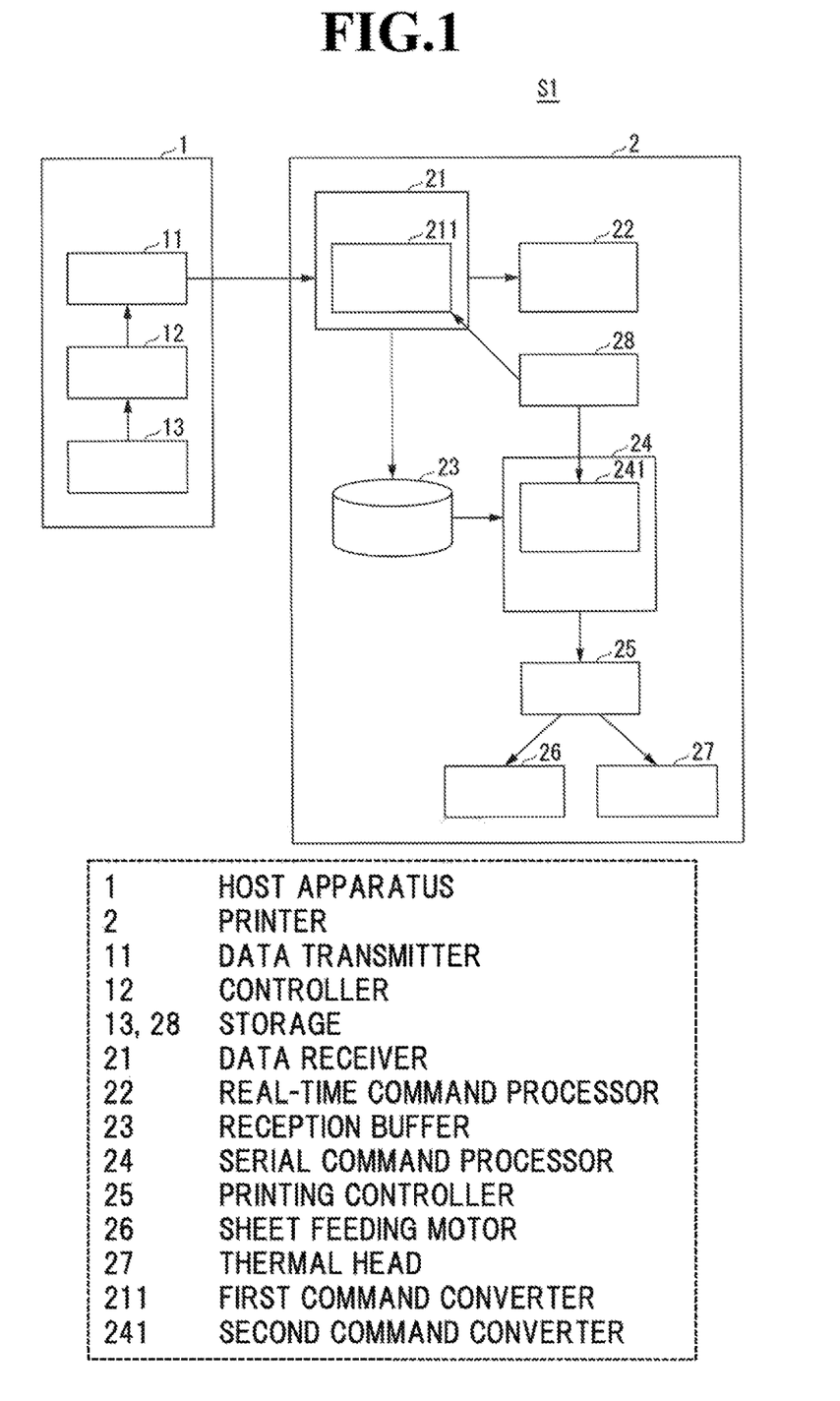
FIG. 1 is a block diagram for illustrating a configuration of a printing system according to at least one embodiment of the present invention.

Now, at least one embodiment of the present invention is described with reference to the accompanying drawings. FIG. 1 is a block diagram for illustrating a configuration of a printing system S1 according to at least one embodiment. As illustrated in FIG. 1, the printing system S1 includes a host apparatus 1 configured to transmit a command to a printer 2 and the printer 2 configured to perform processing based on a command received from the host apparatus 1. The command includes any one of a serial command for which processing is to be successively executed by a printer after reception thereof and a real-time command for which processing is to be executed by the printer with a priority higher than in a case of a serial command. Examples of the real-time command include a command "CLR" for clearing a reception buffer 23 configured to store a serial command.

The host apparatus 1 includes a data transmitter 11, a controller 12, and a storage 13. The data transmitter 11 transmits a command to the printer 2.

The controller 12 converts a command based on a conversion condition when the command satisfies a predetermined condition, and transmits a conversion code obtained through the conversion from the data transmitter 11 to the printer 2 as the command. More specifically, in a case of transmitting a real-time command, the controller 12 divides a data byte of the real-time command into most significant bits and least significant bits, and converts the most significant bits and the least significant bits that have been obtained through the division into conversion codes for the real-time command. That is, the controller 12 converts the data byte of the real-time command into a two-byte conversion code for the real-time command, and transmits the conversion code to the printer 2 as the command.

In addition, in a case of transmitting a serial command, the controller 12 first discriminates whether or not data of the serial command includes a conversion code for a real-time command or the conversion code for a serial command. When a data byte of the serial command is a conversion code for a serial command, the controller 12 transmits, to the printer 2, a command obtained by converting the data byte into a two-byte conversion code for the serial command. Meanwhile, when the data byte of the serial command is a conversion code for a real-time command, the controller 12 transmits, to the printer 2, a command obtained by converting the data byte into two-byte data in which the code for the serial command follows the conversion code for a serial command. When the data byte of the serial command is not a conversion code for a real-time command and is not a conversion code for a serial command, the controller 12 transmits the data byte as it is.

The storage 13 stores conversion conditions, conversion codes for a real-time command, a conversion code for a serial command, and codes for a serial command.

The primer 2 includes a data receiver 21, a real-time command processor 22, the reception buffer 23, a serial command processor 24, a printing controller 25, a sheet feeding motor 26, a thermal head 27, and a storage 28.

The data receiver 21 receives a command from the host apparatus 1. The data receiver 21 includes a first command converter 211.

The first command converter 211 discriminates whether or not the received command is a conversion code obtained through the conversion based on the conversion condition, and when the command is such a conversion code, converts the conversion code into the command based on the conversion condition. More specifically, the first command converter 211 determines that the command is a real-time command when the received command is a conversion code for a real-time command, determines that the command is a serial command when the received command is a conversion code for a serial command, and determines that the command is a serial command when the received command is not a conversion code for a real-time command and is not a conversion code for a serial command. When determining that the received command is a real-time command, the first command converter 211 converts the conversion code for a real-time command into the real-time command based on the conversion condition, and outputs the real-time command obtained through the conversion to the real-time command processor 22. Specifically, the first command converter 211 extracts the most significant four bits and the least significant four bits of the data byte of the real-time command from each piece of the two-byte conversion code for the real-time command, combines the most significant four bits and the least significant four bits with each other, and converts the combination into the real-time command. Meanwhile, when determining that the received command is a serial command, the first command converter 211 writes the received command to the reception buffer 23 to store the received command therein.

When the received command is a conversion code for a real-time command, the real-time command processor 22 executes processing based on the real-time command obtained through the conversion by the first command converter 211. In short, the real-time command processor 22 executes processing based on a real-time command input from the first command converter 211.

The reception buffer 23 stores received serial commands in order. The serial command processor 24 extracts the serial commands from the reception buffer 23 in order. The serial command processor 24 executes a command obtained through the conversion by a second command converter 241 when the serial command is a conversion code, and executes the serial command when the serial command is not a conversion code. The serial command processor 24 includes the second command converter 241.

The second command converter 241 discriminates whether or not tire serial command is a conversion code obtained through the conversion based on the conversion condition, and when the serial command is such a conversion code, converts the conversion code into the serial command based on the conversion condition. For example, when the received command is a conversion code for a serial command, the second command converter 241 determines that the command is a serial command, converts the conversion code for a serial command into the serial command based on the conversion condition, and outputs the serial command obtained through the conversion to the serial command processor 24. More specifically, in a case where the data byte of the serial command is a conversion code for a serial command, when the subsequent data byte is another conversion code for a serial command, the second command converter 241 converts the two-byte conversion code for a serial command into a one-byte conversion code for a serial command, and when the subsequent data byte is not a conversion code for a serial command, converts the subsequent data byte into a conversion code for a real-time command.

When the received command is not a conversion code for a real-time command and is not a conversion code for a serial command, the second command converter 241 determines that the command is a serial command, and outputs the command to the serial command processor 24. That is, when the data byte of the serial command is not a conversion code for a real-time command and is not a conversion code for a serial command, the second command converter 241 outputs the data byte to the serial command processor 24 as it is.

The printing controller 25 controls the sheet feeding motor 26 and the thermal head 27 based on an instruction issued by the serial command processor 24 to print data indicated by the serial command. The sheet feeding motor 26 causes a sheet to be conveyed. The thermal head 27 performs printing on the sheet. The storage 28 stores conversion conditions, conversion codes for a real-time command, a conversion code for a serial command, and codes for a serial command.

Figure 2:
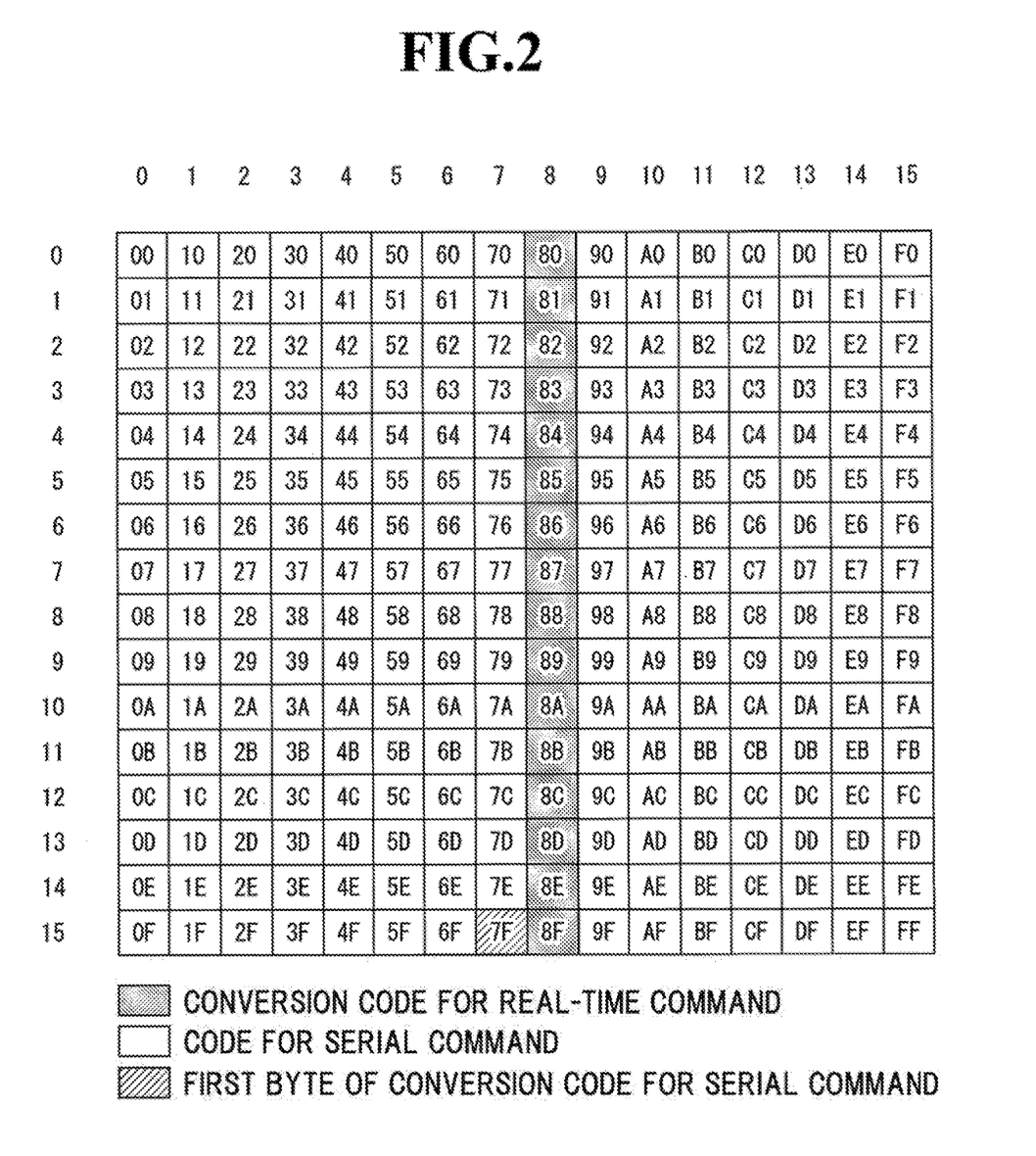
FIG. 2 is a schematic diagram for illustrating an example of conversion codes for a real-time command and a conversion code for a serial command in at least one embodiment.

FIG. 2 is a schematic diagram for illustrating an example of conversion codes for a real-time command and a conversion code for a serial command in at least one embodiment. In this example, the conversion codes for a real-time command are "0x80" to "0x8f". The conversion code for a serial command is "0x7f". Codes for a serial command to be processed as serial commands are the rest, namely, "0x00" to "0x70" and "0x90" to "0xff".

The conversion codes for a real-time command are not limited to "0x80" to "0x8f", and it suffices that the conversion codes for a real-time command are, for example, "0x90" to "0x9f" or other such range of codes having the same most significant bits and exhibiting a low frequency of use for a serial command. In the same manner, the conversion code for a serial command is not limited to "0x7f", and it suffices that the conversion code for a serial command is, for example, "0xaf" or other such freely-selected code exhibiting a low frequency of use for a serial command.

Next, an operation to be performed in the printing system S1 is described by taking a specific example. For example, in a case of transmitting a real-time command "CLR" ("0x43,0x4c,0x52"), the controller 12 of the host apparatus 1 divides the one-byte data byte "0x43" into the most significant four bits "4" and the least significant four bits "3", and converts the most significant four bits "4" into the conversion code "0x84" for a real-time command and the least significant four bits into the conversion code "0x83" for a real-time command, to thereby obtain 2-byte data "0x84,0x83". The respective data bytes of a real-time command are converted in this manner, to thereby convert "0x43,0x4c,0x52" indicating "CLR" into "0x84,0x83,0x84, 0x80,0x85,0x82". The data transmitter 11 transmits the conversion code for the real-time command, which has been obtained through the conversion. The real-time command is converted into a double-sized conversion code for a real-time command, but the frequency of use of the real-time command is extremely low, and hence little influence is exerted on a size of data to be transmitted from the host apparatus 1.

The data receiver 21 of the printer 2 receives the conversion code ("0x84,0x83,0x84,0x80,0x85,0x82") for a real-time command transmitted from the host apparatus 1. The most significant four bits of the data byte of every received command are "0x8", and hence the first command converter 211 determines that the received command is a real-time command, and combines the least significant four bits "4" of the first byte "0x84" and the least significant four bits "3" of the second byte "0x83" with each other to restore the data byte "0x43" of the real-time command. By thus combining the least significant four bits for every two bytes of the conversion code for a real-time command, it is possible to convert the conversion code ("0x84,0x83,0x84,0x8c,0x85, 0x82") for a real-time command into the real-time command ("0x43,0x4c,0x52"). The first command converter 211 outputs the real-time command, which has been obtained through the conversion, to the real-time command processor 22. The real-time command processor 22 executes the processing "CLR" indicated by the input real-time command.

In a case of transmitting a serial command "Print data", all the data bytes of the serial command fall within the range from "0x00" to "0x7e" (that is, the serial command includes no conversion code for a real-time command and no conversion code for a serial command), and hence the controller 12 of the host apparatus 1 causes the data transmitter 11 to transmit the serial command as it is.

The data receiver 21 of the printer 2 receives the serial command "Print data" transmitted from the host apparatus 1. The received serial command "Print data" includes no conversion code for a real-time command, and hence the first command converter 211 writes the serial command to the reception buffer 23. The second command converter 241 extracts the serial command "Print data" from the reception buffer 23. The extracted serial command includes no conversion code for a serial command, and hence the second command converter 241 outputs the serial command to the serial command processor 24 as it is. The serial command processor 24 controls the printing controller 25 to print "Print data" indicated by the serial command.

In a case of an image command for instructing to print an image, when a given data byte in a data section representing the image is a code (within the range from "0x00" to "0x7e" or the range from "0x90" to "0xff") for a serial command, the controller 12 of the host apparatus 1 causes the data transmitter 11 to transmit the given data byte as it is. When a given data byte in the data section representing the image is the conversion code "0x7f" for a serial command, the controller 12 causes the data transmitter 11 to transmit two bytes "0x7f,0x7f". That is, when the data section representing the image of the image command includes the conversion code "0x7f" for a serial command, the controller 12 causes the data transmitter 11 to transmit two bytes of the data byte "0x7f". The conversion code "0x7f" for a serial command is converted into a double-sized conversion code for a serial command, but the conversion code for a serial command is convened into a code exhibiting a low frequency of use for a serial command, to thereby be able to reduce the influence exerted on the size of data to be transmitted from the host apparatus 1.

Meanwhile, when a given data byte in the data section representing the image is a conversion code (within the range from "0x80" to "0x8f") for a real-time command, the controller 12 causes the data transmitter 11 to transmit "0x7f", and then causes the data transmitter 11 to transmit a data byte representing the least significant four bits ("0x00" to "0x0f") of the given data byte. For example, "0x80" is converted into "0x7f,0x00", "0x8c" is converted into "0x7f, 0x0c", and "0x8f" is converted into "0x7f,0x0f". The conversion code (each of "0x80" to "0x8f") for a real-time command included in the image command is converted into double-sized data, but the conversion code for a real-time command is converted into a range of codes exhibiting a low frequency of use for a serial command, to thereby be able to reduce the influence exerted on the size of data to be transmitted from the host apparatus 1.

The data receiver 21 of the printer 2 receives the image command transmitted from the host apparatus 1. The received image command includes no conversion code for a real-time command, and hence the first command converter 211 writes the image command to the reception buffer 23. The second command converter 241 extracts the image command from the reception buffer 23, and processes the image command for every byte. When the data byte is a code for a serial command, the second command converter 241 outputs the data byte to the serial command processor 24 as it is.

In another case, when the data byte is the conversion code "0x7f" for a serial command, the second command converter 241 extracts the subsequent data byte. When the subsequent data byte is the conversion code "0x7f" for a serial command, the second command converter 241 outputs the two bytes of the conversion code "0x7f" for a serial command to the serial command processor 24 as the one-byte data "0x7f". That is, the two-byte data "0x7f,0x7f" is converted into the one-byte data "0x7f".

Meanwhile, when the subsequent data byte is not the conversion code "0x7f" for a serial command, the second command converter 241 converts the data into one-byte data obtained by adding "0x80" to the least significant four bits of the subsequent data byte, and outputs the one-byte data to the serial command processor 24. For example, when the subsequent data byte is "0x0c", the second command converter 241 converts the data into the data byte "0x8c". That is, the two-byte data "0x7f,0x0c" is converted into the one-byte data "0x8c". The serial command processor 24 controls the printing controller 25 to print an image indicated by the serial command.

Figure 3:
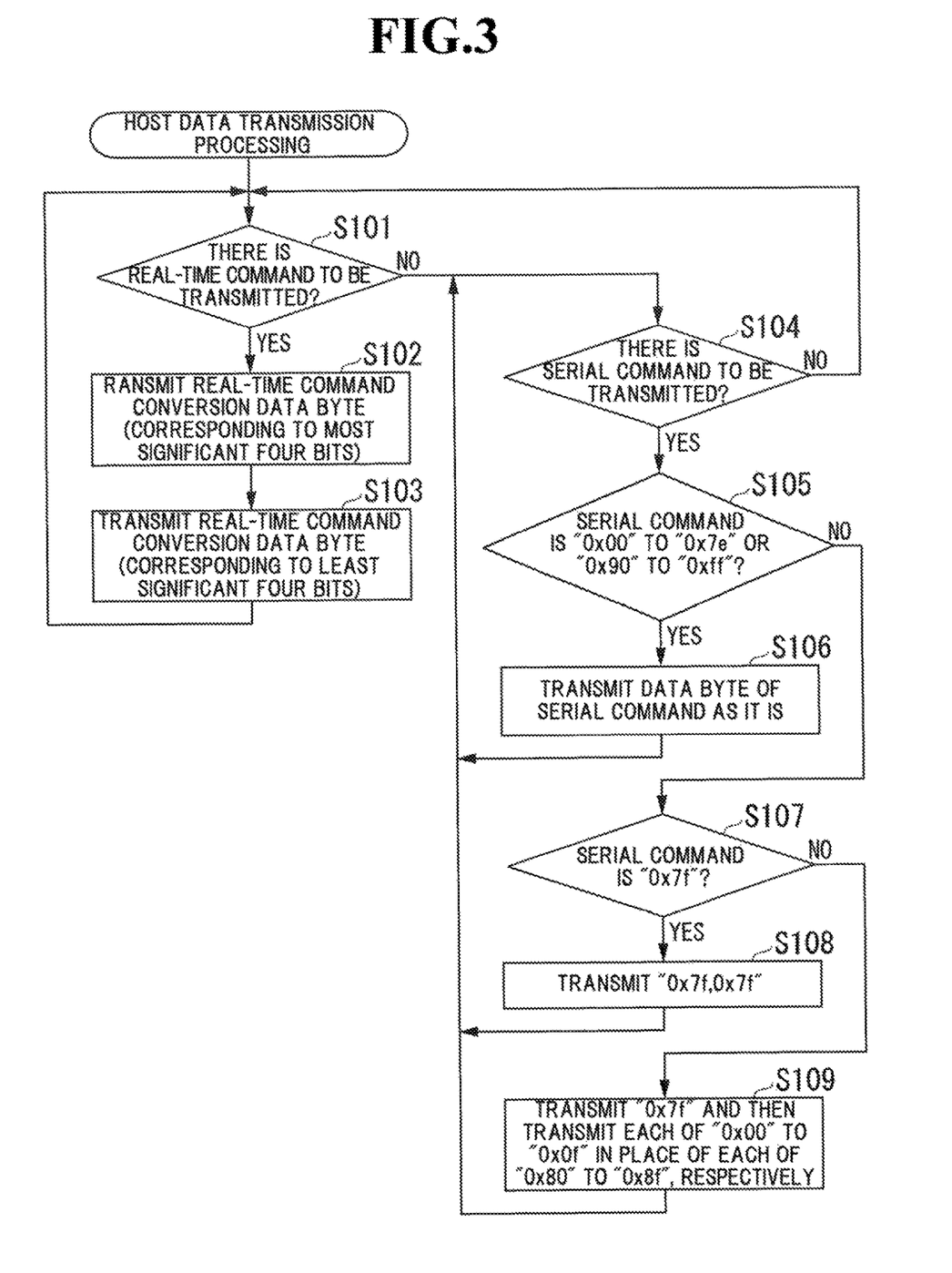
FIG. 3 is a flow chart for illustrating a processing procedure for host data transmission processing to be executed by a host apparatus in at least one embodiment.

FIG. 3 is a flow chart for illustrating a processing procedure for host data transmission processing to be executed by the host apparatus 1 in at least one embodiment.

(Step S101) The controller 12 determines whether or not there is a real-time command to be transmitted to the printer 2. When the controller 12 determines that there is a real-time command, the procedure advances to the processing of Step 102. Meanwhile, when the controller 12 determines that there is no real-time command, the procedure advances to the processing of Step 104.

(Step S102) The controller 12 transmits, from the data transmitter 11, a one-byte real-time command conversion data byte obtained by converting the most significant four bits of the data byte of the real-time command into a conversion code for a real-time command. After that, the procedure advances to the processing of Step S103.

(Step S103) The controller 12 transmits, from the data transmitter 11, a one-byte real-time command conversion data byte obtained by converting the least significant four bits of the data byte of the real-time command into a conversion code for a real-time command. After that, the procedure returns to the processing of Step S101.

(Step S104) The controller 12 determines whether or not there is a serial command to be transmitted to the printer 2. When the controller 12 determines that there is a serial command, the procedure advances to the processing of Step 105. Meanwhile, when the controller 12 determines that there is no serial command, the procedure returns to the processing of Step 101.

(Step S105) The controller 12 determines whether or not the data byte of the serial command to be transmitted is a code (within the range from "0x00" to "0x7e" or the range from "0x90" to "0xff") for a serial command. When the controller 12 determines that the data byte is a code for a serial command, the procedure advances to the processing of Step 106. Meanwhile, when the controller 12 determines that the data byte is not a code for a serial command, the procedure advances to the processing of Step 107.

(Step S106) The controller 12 causes the data transmitter 11 to transmit the data byte of the serial command as it is. After that, the procedure returns to the processing of Step 104.

(Step S107) The controller 12 determines whether or not the data byte of the serial command to be transmitted is a conversion code "0x7f" for a serial command. When the controller 12 determines that the data byte is a conversion code for a serial command, the procedure advances to the processing of Step 108. Meanwhile, when the controller 12 determines that the data byte is not a conversion code for a serial command, the procedure advances to the processing of Step 109.

(Step S108) The controller 12 causes the data transmitter 11 to transmit two bytes of the conversion code "0x7f" for a serial command. After that, the procedure returns to the processing of Step 104.

(Step S109) The controller 12 causes the data transmitter 11 to transmit the conversion code "0x7f" for a serial command, and then causes the data transmitter 11 to transmit a data byte representing the least significant four bits of the data byte of the serial command (namely, transmit a data byte obtained by converting each of "0x80" to "0x8f" into each of "0x00" to "0x0f", respectively). After that, the procedure returns to the processing of Step 104.

Figure 4:
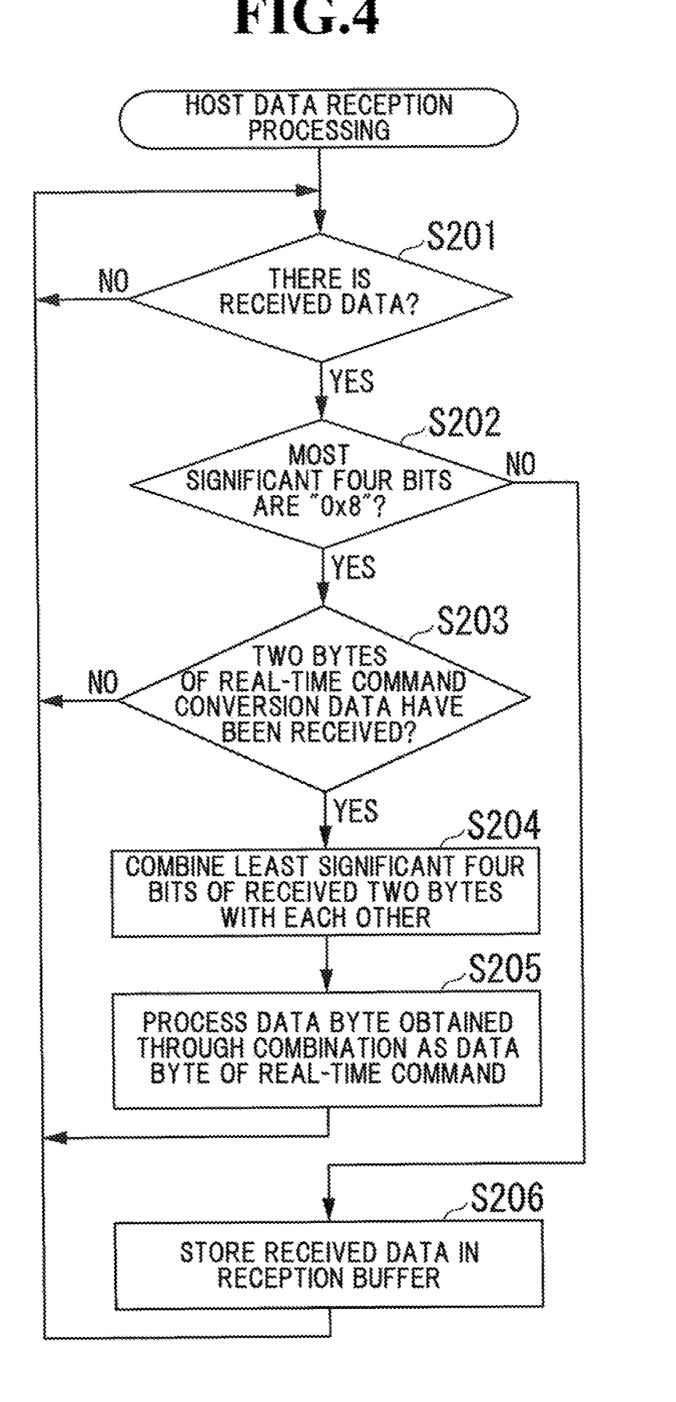
FIG. 4 is a flow chart for illustrating a processing procedure for host data reception processing to be executed by a printer according to at least one embodiment.

FIG. 4 is a flow chart for illustrating a processing procedure for host data reception processing to be executed by the printer 2 according to at least one embodiment.

(Step S201) The data receiver 21 determines whether or not there is received data. When the data receiver 21 determines that there is received data, the procedure advances to the processing of Step 202. Meanwhile, when the data receiver 21 determines that there is no received data, the data receiver 21 again executes the processing of Step S201.

(Step S202) The first command converter 211 determines whether or not the most significant four bits of the data byte of the received data are "0x8". When the most significant four bits of the data byte are "0x8", the first command convener 211 determines that the received data is real-time command conversion data obtained by converting a real-time command, the procedure advances to the processing of Step 203. Meanwhile, when the most significant four bits of the data byte are not "0x8", the procedure advances to the processing of Step 206.

(Step S203) The first command converter 211 determines whether or not two bytes of real-time command conversion data have been received. When the first command converter 211 determines that two bytes have been received, the procedure advances to the processing of Step 204. Meanwhile, when the first command converter 211 determines that two bytes have not been received, the procedure returns to the processing of Step 201.

(Step S204) The first command converter 211 converts the received two bytes of real-time command conversion data into one-byte data by combining the least significant four bits of the received two bytes with each other. After that, the procedure advances to the processing of Step 205.

(Step S205) The real-time command processor 22 processes the data byte obtained through the conversion by the first command converter 211 as the data byte of the real-time command. After that, the procedure returns to the processing of Step 201.

(Step S206) The first command converter 211 writes the received data to the reception buffer 23 as it is to store the received data therein. After that, the procedure returns to the processing of Step 201.

Figure 5:
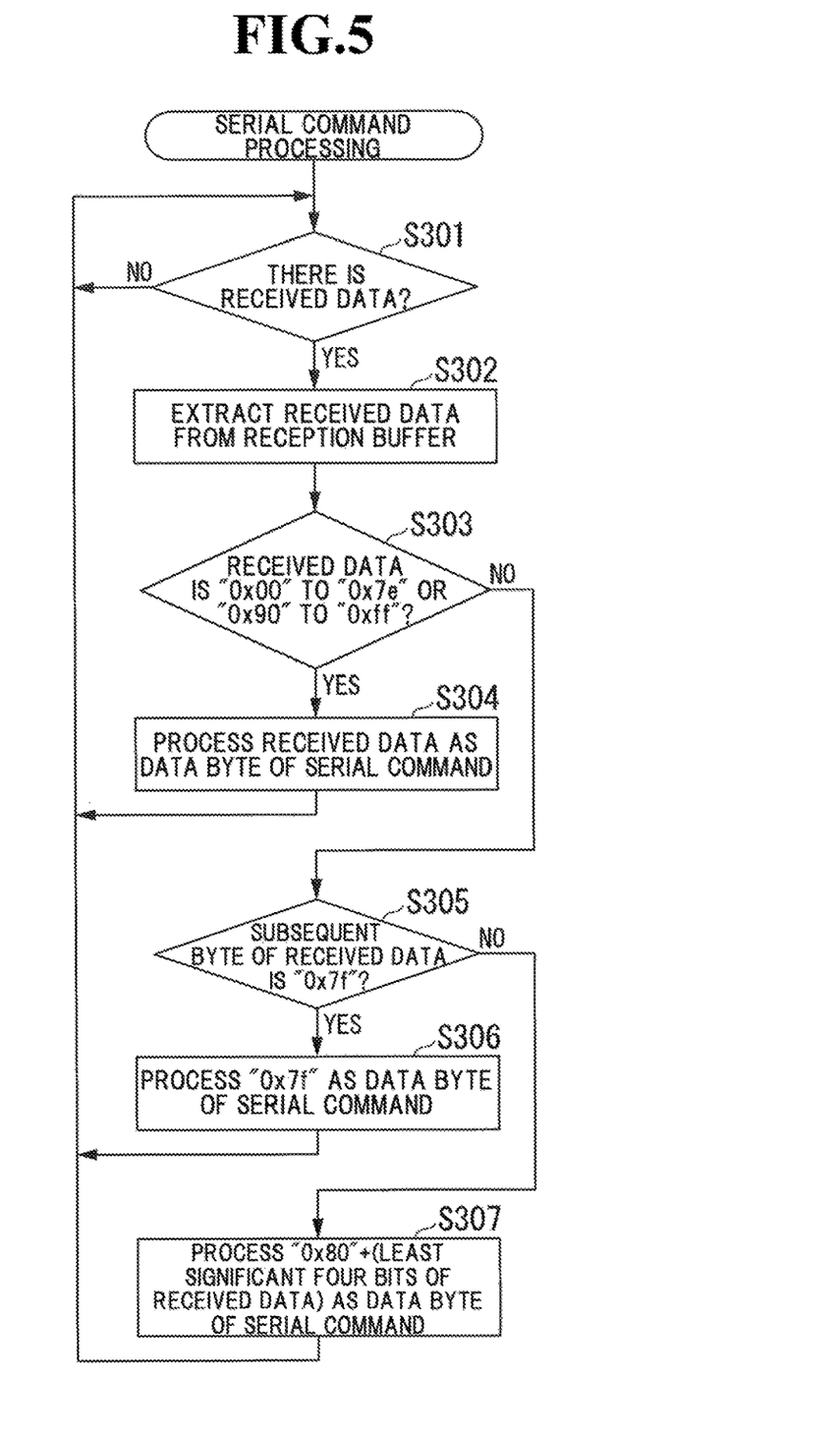
FIG. 5 is a flow chart for illustrating a processing procedure for serial command processing to be executed by the printer according to at least one embodiment.

FIG. 5 is a flow chart for illustrating a processing procedure for serial command processing to be executed by the printer 2 according to at least one embodiment.

(Step S301) The second command converter 241 determines whether or not the received data Is stored in the reception buffer 23. When the second command converter 241 determines that the received data is stored the procedure advances to the processing of Step 302. Meanwhile, when the second command converter 241 determines that the received data is not stored, the second command converter 241 again executes the processing of Step S301.

(Step S302) The second command converter 241 extracts one byte of the received data from the reception buffer 23. After that, the procedure advances to the processing of Step 303.

(Step S303) The second command converter 241 determines whether or not the extracted one-byte received data is a code (within the range from "0x00" to "0x7e" or the range from "0x90" to "0xff") for a serial command. When the second command converter 241 determines that the received data is a code for a serial command, the procedure advances to the processing of Step 304. Meanwhile, when the second command converter 241 determines that the received data is not a code for a serial command, the procedure advances to the processing of Step 305.

(Step S304) The serial command processor 24 processes the received data as the data byte of the serial command as it is. After that, the procedure returns to the processing of Step 301.

(Step S305) The second command converter 241 extracts the subsequent one byte of the received data from the reception buffer 23, and determines whether or not the extracted subsequent byte of the received data is the conversion code ("0x7f") for a serial command. When the second command converter 241 determines that the subsequent byte of the received data is the conversion code for a serial command, the procedure advances to the processing of Step 306. Meanwhile, when the second command converter 241 determines that the subsequent byte of the received data is not the conversion code for a serial command, the procedure advances to the processing of Step 307.

(Step S306) The serial command processor 24 processes "0x7f" as the data byte of the serial command. After that, the procedure returns to the processing of Step 301.

(Step S307) The serial command processor 24 processes data obtained by adding "0x80" to the least significant four bits of the subsequent byte of the received data as the data byte of the serial command. After that, the procedure returns to the processing of Step 301.

As described above, the printing system S1 according to at least one embodiment includes the host apparatus 1 configured to transmit a command to the printer 2, and a printer 2 configured to perform processing based on the command received from the host apparatus 1. The host apparatus 1 is configured to convert the command based on a conversion condition when the command satisfies a predetermined condition, and transmit a conversion code obtained through the conversion to the printer 2 as the command. The printer 2 includes the data receiver 21 configured to receive the command from the host apparatus 1, the first command converter 211 and the second command converter 241 configured to discriminate whether the received command is the conversion code obtained through the conversion based on the conversion condition, and when the command is the conversion code, convert the conversion code into the command based on the conversion condition, and the real-time command processor 22 and the serial command processor 24 configured to execute the command obtained through the conversion when the command is the conversion code, and execute the received command when the command is not the conversion code. With this configuration, it is possible to prevent erroneous recognition of a command by simple processing.

Further, the command includes any one of a serial command for which processing is to be successively executed by the printer after reception thereof and a real-time command for which processing is to be executed by the printer with a priority higher than in a case of the serial command. The first command converter 211 is configured to determine that the command is the real-time command when the received command is the conversion code for the real-time command, and the second command converter 241 is configured to determine that the command is the serial command when the received command is the conversion code for the serial command, and determine that the command is the serial command when the received command is not the conversion code for the real-time command and is not the conversion code for the serial command. With this configuration, it is possible to prevent a real-time command and a serial command from being erroneously recognized by simple processing.

Further, the host apparatus 1 is configured to divide, in a case of transmitting the real-time command, a data byte of the real-time command into most significant bits and least significant bits, and transmit two bytes obtained by converting the most significant bits and the least significant bits into a conversion code for the real-time command to the printer 2 as the command, and discriminate, in a case of transmitting the serial command, whether data of the serial command includes one of a conversion code for the real-time command and a conversion code for the serial command, transmit, when a data byte of the serial command is a conversion code for the serial command, a command obtained by converting the data byte into a two-byte conversion code for the serial command to the printer 2 as the command, and transmit, when a data byte of the serial command is a conversion code for the real-time command, a command obtained by converting the data byte into two-byte data in which a code for the serial command follows the conversion code for the serial command to the printer 2 as the command. The first command converter 211 is configured to determine that the command is the real-time command when the received command is the conversion code for the real-time command, convert the conversion code for the real-time command into the real-time command based on the conversion condition, and output the real-time command obtained through the conversion to the real-time command processor 22. The second command converter 241 is configured to determine that the command is the serial command when the received command is the conversion code for the serial command, convert the conversion code for the serial command into the serial command based on the conversion condition, and output the serial command obtained through the conversion to the serial command processor 24, and determine that the command is the serial command when the received command is not the conversion code for the real-time command and is not the conversion code for the serial command, and output the command to the serial command processor 24.

With this configuration, it is possible to distinguish between the serial command and the real-time command while avoiding erroneous recognition thereof with a simple conversion without imposing any limitations on the range of codes. Further, "0x00", "0xff", or other such code frequently used as image data (serial command) for a monochrome printer can be transmitted as it is, and hence the size of data hardly increases during the conversion.

In the above-mentioned at least one embodiment, a thermal printer is described as an example of the printer 2, but the printer 2 is not limited thereto, and an inkjet printer, a laser printer, or other such printer may be employed.

All or a portion of the function of each device included in the host apparatus 1 and the printer 2 in the above-mentioned at least one embodiment may also be implemented by recording a program for implementing those functions in a computer-readable recording medium, and reading and executing the program recorded in the recording medium on a computer system. As used herein, the "computer system" may include an OS and hardware, for example, a peripheral device.

The term "computer-readable recording medium" refers to portable media, such as a flexible disk, a magneto-optical disc, a ROM, and a CD-ROM, or a storage included in the computer system, for example, a hard disk drive. The term "computer-readable recording medium" may also refer to a medium configured to dynamically hold a program for a short period of time, like a communication cable used when a program is transmitted via a network, for example, the Internet, or a communication line, for example, a telephone line, or to a medium configured to hold a program for a fixed period of time, like a volatile memory in a computer system serving as a server or a client in such a case. The above-mentioned program may be a program for implementing a portion of the above-mentioned functions, or may be capable of implementing the above-mentioned functions in combination with a program already recorded in the computer system.

This concludes the descriptions of at least one embodiment as at least one mode for carrying out the present invention. However, the present invention is not limited to the above-mentioned at least one embodiment in any way, and various modifications and substitutions can be made within the scope that does not depart from the spirit of the present invention.

What is claimed is:

1. A printing system, comprising:
a host apparatus configured to transmit a command to a printer; and
a printer configured to perform processing based on the command received from the host apparatus,
wherein the host apparatus is configured to:
convert the command into a conversion code based on a command type including a real-time command and a serial command when the command satisfies a predetermined condition;
for the real-time command, convert a data byte of the real-time command into a two-byte conversion code;
for the serial command, convert a data type of the serial command into the two-byte conversion code; and
transmit the conversion code to the printer as the command, and
wherein the printer includes:
a receiver configured to receive the command from the host apparatus;
a command converter configured to discriminate whether the received command is the conversion code, and when the command is the conversion code, convert the conversion code into the command based on a conversion code type; and
a command processor configured to execute the command obtained through the conversion by the command converter when the command is the conversion code, and execute the received command when the command is not the conversion code.

2. The printing system according to claim 1,
wherein the command includes any one of the serial command for which processing is to be successively executed by the printer after reception of the serial command and the real-time command for which processing is to be executed by the printer with a priority higher than in a case of the serial command, and
wherein the command converter is configured to:
determine that the command is the real-time command when the received command is the conversion code for the real-time command;
determine that the command is the serial command when the received command is the conversion code for the serial command; and
determine that the command is the serial command when the received command is not the conversion code for the real-time command and is not the conversion code for the serial command.

3. The printing system according to claim 2,
wherein the host apparatus is configured to:
divide, in a case of transmitting the real-time command, a data byte of the real-time command into most significant bits and least significant bits, and transmit two bytes obtained by converting the most significant bits and the least significant bits into a conversion code for the real-time command to the printer as the command; and
discriminate, in a case of transmitting the serial command, whether data of the serial command includes one of a conversion code for the real-time command and a conversion code for the serial command, transmit, when a data byte of the serial command is a conversion code for the serial command, a command obtained by converting the data byte into a two-byte conversion code for the serial command to the printer as the command, and transmit, when a data byte of the serial command is a conversion code for the real-time command, a command obtained by converting the data byte into two-byte data in which a code for the serial command follows the conversion code for the serial command to the printer as the command,
wherein the command converter includes:
a first command converter; and
a second command converter,
wherein the command processor includes:
a serial command processor configured to execute processing based on the serial command; and
a real-time command processor configured to execute processing based on the real-time command,
wherein the first command converter is configured to determine that the command is the real-time command when the received command is the conversion code for the real-time command, convert the conversion code for the real-time command into the real-time command based on the conversion condition, and output the real-time command obtained through the conversion to the real-time command processor, and
wherein the second command converter is configured to:
determine that the command is the serial command when the received command is the conversion code for the serial command, convert the conversion code for the serial command into the serial command based on the conversion condition, and output the serial command obtained through the conversion to the serial command processor; and
determine that the command is the serial command when the received command is not the conversion code for the real-time command and is not the conversion code for the serial command, and output the command to the serial command processor.

4. A printer, comprising:
a receiver configured to receive a command that is converted into a conversion code based on a command type including a real-time command and a serial command;
a command converter configured to:
discriminate whether the received command is the conversion code obtained through conversion based on the command type;
when the command is the real-time command, convert a data byte of the real-time command into a two-byte conversion code; and
when the command is the serial command, convert a data type of the serial command into the two-byte conversion code;
and a command processor configured to execute the command obtained through the conversion by the command converter when the command is the conversion code, and execute the received command when the command is not the conversion code.

5. The printer according to claim 4, wherein the command includes any one of the serial command for which processing is to be successively executed by the printer after reception of the serial command and the real-time command for which processing is to be executed by the printer with a priority higher than in a case of the serial command, and wherein the command converter is configured to:

determine that the command is the real-time command when the received command is the conversion code for the real-time command;

determine that the command is the serial command when the received command is the conversion code for the serial command; and determine that the command is the serial command when the received command is not the conversion code for the real-time command and is not the conversion code for the serial command.

6. The printer according to claim 5, wherein the command converter includes:

a first command converter; and a second command converter, wherein the command processor includes:

a serial command processor configured to execute processing based on the serial command; and a real-time command processor configured to execute processing based on the real-time command, wherein the first command converter is configured to determine that the command is the real-time command when the received command is the conversion code for the real-time command, convert the conversion code for the real-time command into the real-time command based on the predetermined conversion condition, and output the real-time command obtained through the conversion to the real-time command processor, and wherein the second command converter is configured to:

determine that the command is the serial command when the received command is the conversion code for the serial command, convert the conversion code for the serial command into the serial command based on the predetermined conversion condition, and output the serial command obtained through the conversion to the serial command processor; and determine that the command is the serial command when the received command is not the conversion code for the real-time command and is not the conversion code for the serial command, and output the command to the serial command processor.

7. A printing control method to be performed in a printing system, the printing system including:

a host apparatus configured to transmit a command to a printer; and a printer configured to perform processing based on the command received from the host apparatus, the printing control method comprising:

converting, by the host apparatus, the command into a conversion code based on a command type including a real-time command and a serial command when the command satisfies a predetermined condition; and for the real-time command, converting, by the host apparatus, a data byte of the real-time command into a two-byte conversion code;

for the serial command, converting, by the host apparatus, a data byte of the serial command into the two-byte conversion code;

transmitting the conversion code to the printer as the command;

receiving, by the printer, the command from the host apparatus;

discriminating, by the printer, whether the received command is the conversion code, and when the command is the conversion code, converting the conversion code into the command based on a conversion code type; and executing, by the printer, the command obtained through the conversion when the command is the conversion code, and executing the received command when the command is not the conversion code.

8. A printing control method to be performed in a printer, the printing control method comprising:

receiving a command that is converted into a conversion code based on a command type including a real-time command and a serial command;

discriminating whether the received command is the conversion code obtained through conversion based on the command type;

when the command is the real-time command, converting a data byte of the real-time command into a two-byte conversion code; and when the command is the serial command, converting a data type of the serial command into the two-byte conversion code;

and executing the command obtained through the conversion when the command is the conversion code, and executing the received command when the command is not the conversion code.

* * * * *